US012520895B2

(12) United States Patent
Kawasaki et al.

(10) Patent No.: US 12,520,895 B2
(45) Date of Patent: Jan. 13, 2026

(54) INFORMATION PROCESSING SYSTEM, INFORMATION PROCESSING METHOD, AND PROGRAM

(71) Applicant: SYNFLUX CO., LTD., Tokyo (JP)

(72) Inventors: Kazuya Kawasaki, Tokyo (JP); Kotaro Sano, Tokyo (JP); Hiroki Okamoto, Tokyo (JP); Yusuke Fujihira, Tokyo (JP)

(73) Assignee: SYNFLUX CO., LTD. (JP)

( * ) Notice: Subject to any disclaimer, the term of this patent is extended or adjusted under 35 U.S.C. 154(b) by 0 days.

(21) Appl. No.: 18/839,312

(22) PCT Filed: Feb. 21, 2023

(86) PCT No.: PCT/JP2023/006306
§ 371 (c)(1),
(2) Date: Aug. 16, 2024

(87) PCT Pub. No.: WO2023/162994
PCT Pub. Date: Aug. 31, 2023

(65) Prior Publication Data
US 2025/0151828 A1  May 15, 2025

(30) Foreign Application Priority Data

Feb. 22, 2022  (JP) ................. 2022-025796
Oct. 13, 2022  (JP) ................. 2022-164998

(51) Int. Cl.
A41H 3/00 (2006.01)
G06Q 10/04 (2023.01)

(52) U.S. Cl.
CPC ........... A41H 3/007 (2013.01); G06Q 10/043 (2013.01); Y02P 80/40 (2015.11)

(58) Field of Classification Search
None
See application file for complete search history.

(56) References Cited

U.S. PATENT DOCUMENTS 3,596,068 A * 7/1971 Doyle .................. A41H 3/007
                                                        702/158
4,554,635 A * 11/1985 Levine .................. G06F 30/18
                                                        703/1
(Continued)

FOREIGN PATENT DOCUMENTS

EP        0880910 A1 * 12/1998 ........... G06Q 10/043
JP    H08221467 A  *  8/1996
(Continued)

OTHER PUBLICATIONS

International Search Report of the International Searching Authority, issued in PCT/JP2023/006306, mailed May 16, 2023; ISA/JP (5 pages).

(Continued)

Primary Examiner — Grace Huang
(74) Attorney, Agent, or Firm — Harness, Dickey & Pierce, P.L.C.

(57) ABSTRACT

An information processing system comprises a controller including a processor configured to execute each of the following steps. An acquisition step acquires data on a first pattern relating to a shape of a specific garment. An output step outputs, based on the data on the first pattern and reference information on production of the garment, data on a second pattern relating to the shape of the specific garment. The data on the second pattern includes shapes of two or more two-dimensional pieces of the specific garment, and an area where the pieces are disposed in such a manner that they do not overlap each other and that a total number of the pieces in the area is less than or equal to a predetermined threshold.

15 Claims, 10 Drawing Sheets

(56) References Cited

U.S. PATENT DOCUMENTS

| | | | | |
|---|---|---|---|---|
| 5,172,326 | A * | 12/1992 | Campbell, Jr. | .......... B26D 5/00 |
| | | | | 700/134 |
| 5,495,568 | A * | 2/1996 | Beavin | .................. G09B 23/30 |
| | | | | 700/83 |
| 5,703,781 | A * | 12/1997 | Martell | .................. A41H 3/007 |
| | | | | 700/135 |
| 5,815,398 | A * | 9/1998 | Dighe | .................. G06Q 10/043 |
| | | | | 700/171 |
| 5,831,857 | A * | 11/1998 | Clarino | ................ G06Q 10/043 |
| | | | | 700/134 |
| 6,868,303 | B1 * | 3/2005 | Chabirand | ................ B26F 1/38 |
| | | | | 700/135 |
| 9,623,578 | B1 * | 4/2017 | Aminpour | .............. B26D 5/007 |
| 9,840,091 | B2 * | 12/2017 | Cloots | .................. G06F 3/1208 |
| 10,223,830 | B2 * | 3/2019 | Bonner | .................. G06Q 30/00 |
| 11,090,828 | B2 * | 8/2021 | Valeze | .................. B26F 1/3806 |
| 11,421,355 | B2 * | 8/2022 | Karmon | ................. D04B 37/00 |
| 11,712,904 | B2 * | 8/2023 | Landau | .................. B41F 15/10 |
| | | | | 700/131 |
| 2004/0236457 | A1 * | 11/2004 | Stabelfeldt | .............. G06F 30/23 |
| | | | | 700/132 |
| 2016/0210088 | A1 * | 7/2016 | Van Den Branden | ...................... |
| | | | | G06F 3/1219 |
| 2017/0109926 | A1 | 4/2017 | Bonner et al. | |
| 2023/0330880 | A1 * | 10/2023 | Bodivit | .................. G06Q 50/04 |

FOREIGN PATENT DOCUMENTS

| | | | | | |
|---|---|---|---|---|---|
| JP | H09128422 | A | * | 5/1997 | |
| JP | H09-273017 | A | | 10/1997 | |
| JP | 2001-262416 | A | | 9/2001 | |
| JP | 2002-245115 | A | | 8/2002 | |
| JP | 2017-076400 | A | | 4/2017 | |
| JP | 2021066964 | A | * | 4/2021 | ............. A41H 3/007 |
| KR | 100767278 | B1 | * | 10/2007 | ............. G06Q 50/10 |

OTHER PUBLICATIONS

Aric Bartle, et al. "Physics-driven Pattern Adjustment for Direct 3D Garment Editing"; ACM Transactions On Graphics; vol. 35, No. 4, Article 50; publication date: Jul. 11, 2026; pp. 50:1-50:11 (total 11 pages).

Yan Hong, et al. "Collaborative 3D-To-2D Tight-Fitting Garment Pattern Design Process for Scoliotic People"; Fibres & Textiles in Eastern Europe; vol. 25, 5(125); Oct. 31, 2017; pp. 113-118 (total 6 pages).

Dongliang Zhang, et al. "An integrated method of 3D garment design"; The Journal of the Textile Institute; Taylor & Francis; vol. 109, No. 12; Jan. 1, 2018; pp. 1595-1605 (total 12 pages).

Nico Pietroni, et al. "Computational Pattern Making from 3D Garment Models"; ACM Transactions On Graphics; vol. 41, No. 4, Article 157; Jul. 22, 2022; pp. 157:1-157:14 (total 14 pages).

European Search Report issued in the corresponding European Patent Application No. 23759995.6; dated May 20, 2025 (total 9 pages).

* cited by examiner

INFORMATION PROCESSING SYSTEM, INFORMATION PROCESSING METHOD, AND PROGRAM

CROSS REFERENCE TO RELATED APPLICATIONS

This application is a 371 U.S. National Phase of International Application No. PCT/JP2023/006306, filed on Feb. 21, 2023, which claims priority to Japanese Patent Application No. 2022-025796, filed Feb. 22, 2022 and Japanese Patent Application No. 2022-164998, filed Oct. 13, 2022. The entire disclosures of the above applications are incorporated herein by reference.

BACKGROUND

The present disclosure relates to an information processing system, an information processing method and a program.

RELATED ART

There has been a system for creating data on patterns used in producing garment. Japanese Patent Application, Publication No. 2001-262416 discloses a system for creating a pattern for garment.

However, from various perspectives, there is a need for data on superior patterns.

In view of the above circumstances, the present disclosure provides an information processing system configured to provide a second pattern superior to a first pattern.

SUMMARY

According to one aspect of the present disclosure, an information processing system is provided. This information processing system includes a controller. The controller is configured to execute each of the following steps. An acquisition step acquires data on a first pattern relating to a shape of a specific garment. An output step outputs, based on the data on the first pattern and reference information on production of the garment, data on a second pattern relating to the shape of the specific garment. The data on the second pattern includes shapes of two or more two-dimensional pieces of the specific garment, and an area where the pieces are disposed in such a manner that they do not overlap each other. In the area, the pieces are disposed in such a manner that a total number of the pieces in the area is less than or equal to a predetermined threshold.

Such an aspect can provide an information processing system configured to provide a second pattern superior to a first pattern.

DETAILED DESCRIPTION

Hereinafter, with reference to drawings, a description will be given of embodiments of the present disclosure. Various features described in the following embodiments can be combined with each other.

A program for realizing a software described in the present embodiment may be provided as a non-transitory computer-readable memory medium, may be provided to be downloaded via an external server, or may be provided so that the program is activated on an external computer and the program's function is realized on a client terminal (that is, the function is provided by so-called cloud computing).

A term "unit" in the present embodiment may include, for example, a combination of a hardware resource implemented as circuits in a broad sense and information processing of software that can be concretely realized by the hardware resource. Furthermore, various kinds of information are described in the present embodiment, and such information may be represented by, for example, physical values of signal values representing voltage and current, high and low signal values as a set of binary bits consisting of 0 or 1, or quantum superposition (so-called qubits), and communication and computation may be executed on a circuit in a broad sense.

The circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD), a complex programmable logic device (CLPD), field programmable gate array (FPGA), and the like.

1. Hardware Configuration

The present section describes a hardware configuration of the present embodiment. In the present embodiment, an information processing system includes one or more apparatuses or components. Thus, for example, even a single information processing apparatus 1 may be an example of an information processing system. The following is a description of the hardware configuration of an information processing apparatus 1 as an example of an information processing system.

Figure 1:
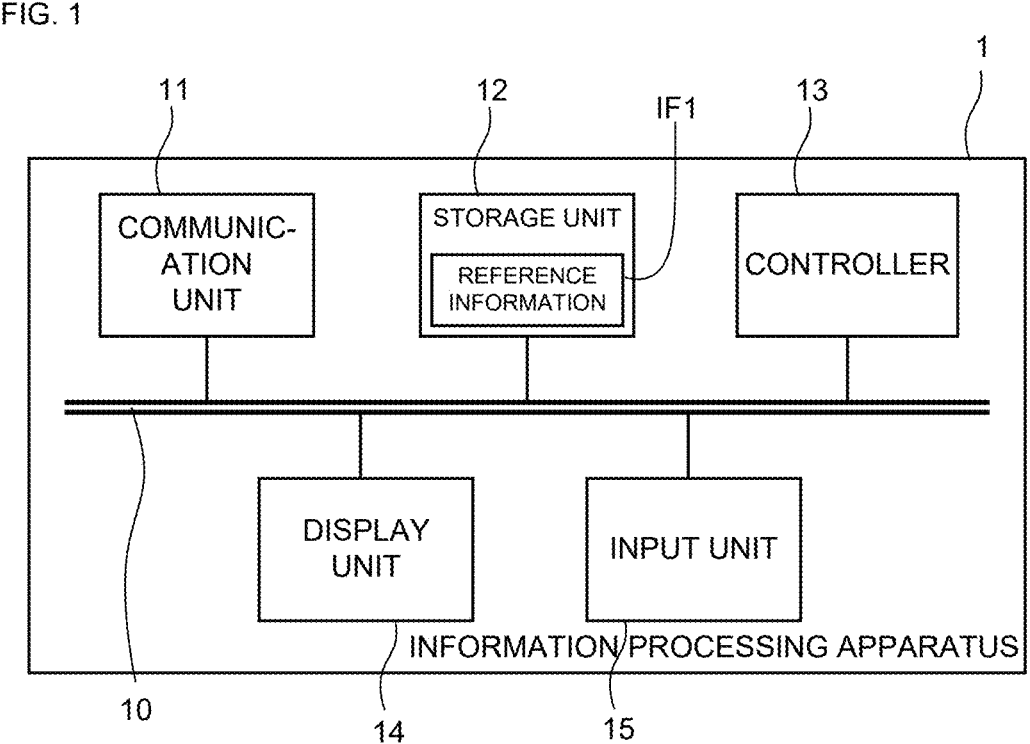
FIG. 1 is a block diagram illustrating a hardware configuration of an information processing apparatus 1.

FIG. 1 is a block diagram illustrating a hardware configuration of the information processing apparatus 1. The information processing apparatus 1 includes a communication unit 11, a storage unit 12, a controller 13, a display unit 14, and an input unit 15. These components are electrically connected inside the information processing apparatus 1 via a communication bus 10. Each component is further described below.

The communication unit 11 may be wired communication means such as USB, IEEE1394, Thunderbolt (registered trademark), wired LAN network communication, or the like, but may include wireless LAN network communication, mobile communication such as 3G/LTE/5G, Bluetooth (registered trademark) communication, or the like as needed.

That is, the communication unit 11 may be implemented as a set of two or more of these communication means. In other words, the information processing apparatus 1 may communicate various information from the outside via the communication unit 11 and a network.

The storage unit 12 stores various types of information defined by the above descriptions. The storage unit 12 may be implemented, for example, as a storage device such as a solid state drive (SSD) storing various programs, etc., pertaining to the information processing apparatus 1 and executed by the controller 21013, or as a memory such as a random access memory (RAM) storing temporarily necessary information (arguments, sequences, etc.) pertaining to program operations. The storage unit 12 stores various programs, variables, etc. pertaining to the information processing apparatus 1 and executed by the controller 13. The storage unit 12 is an example of a memory medium.

The controller 13 executes processing and control on the overall operation pertaining to the information processing apparatus 1. The controller 13 is, for example, a central processing unit (CPU) (not illustrated). The controller 13 reads a predetermined program stored on the storage unit 12 and thereby realizes various functions pertaining to the information processing apparatus 1. In other words, when information processing by software stored in the storage unit 12 is concretely realized by the controller 13 as an example of hardware, the information processing may be executed as each functional unit included in the controller13. A further detailed description thereof will be given in the next section. The controller13 is not limited to being a single controller and may be implemented as two or more controllers 210-13 for each function. Alternatively, a single controller and two or more controllers may be combined.

The display unit 14 may, for example, be contained in a housing of the information processing apparatus 1, or may be externally attached. The display unit 14 displays a graphical user interface (GUI) screen operable for a user. The display unit 14 may be implemented by using, for example, different display devices such as CRT displays, liquid crystal displays, organic EL displays, and plasma displays, depending on the type of the information processing apparatus 1.

The input unit 15 may be contained in the housing of the information processing apparatus 1 or may be externally attached. For example, the input unit 15 may be provided as a whole with the display unit 14 and implemented as a touch panel. With the touch panel, the user can provide input by operation such as taps, swipes, etc. Alternatively, a switch button, a mouse, a QWERTY keyboard, etc. may be used instead of a touch panel. In other words, the input unit 15 receives operation input made by the user. The input is transmitted to the controller 13 as an instruction signal via the communication bus 10, and the controller 13 may execute predetermined control or calculation as necessary.

2. Functional Structure

The present section describes the functional structure of the present embodiment. As described above, when information processing by software stored in the storage unit 12 is concretely realized by the controller 13 as an example of hardware, the information processing may be executed as each functional unit included in the controller 13.

Figure 2:
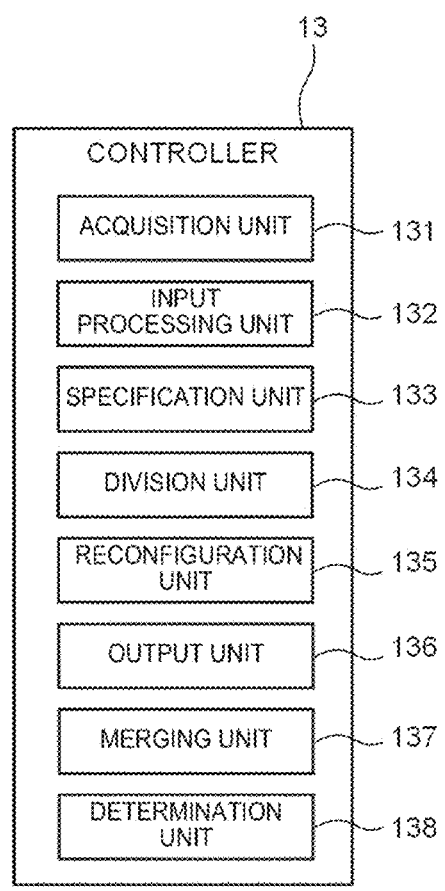
FIG. 2 is a block diagram illustrating functions realized by a controller 13, etc. in the information processing apparatus.

FIG. 2 is a block diagram illustrating functions realized by the controller 13, etc., in the information processing apparatus 1. Specifically, the controller 13 includes an acquisition unit 131, an input processing unit 132, a specification unit 133, a division unit 134, a reconfiguration unit 135, an output unit 136, a merging unit 137, and a determination unit 138.

The acquisition unit 131 is configured to acquire various types of information. For example, the acquisition unit 131 may be configured to execute an acquisition step. This will be described in more detail later.

The input processing unit 132 is configured to input various types of information to reference information IF1. For example, the reference information IF1 may be a trained model having learned correlation between various pieces of information on production of garment.

The specification unit 133 is configured to specify various types of information. In particular, the specification unit 133 is configured to specify the data D2 on a second pattern. This will be described in more detail later.

The division unit 134 is configured to divide a model into two or more meshes. For example, the division unit 134 may be configured to execute a division step. This will be discussed in more detail later.

The reconfiguration unit 135 is configured to reconfigure pieces P from meshes ME. This will be described in more detail later.

The output unit 136 is configured to output various types of information. For example, the output unit 136 may be configured to execute an output step. Specifically, the output unit 136 outputs display information for displaying desired visual information on the display unit 14. This display information may be visual information itself generated in a form visible to the user, such as scenes, images, icons, texts, etc., or may be rendering information for display. Alternatively, it may not be particularly limited to visual information or display information, but may be auditory information, tactile information, or a combination thereof. This will be described in more detail later.

The merging unit 137 is configured to merge two or more pieces P into one. Details thereof will be described later.

The determination unit 138 is configured to determine an arrangement, which meets a condition, from among two or more arrangements. Details thereof will be described later.

3. Information Processing Method

Figure 3:
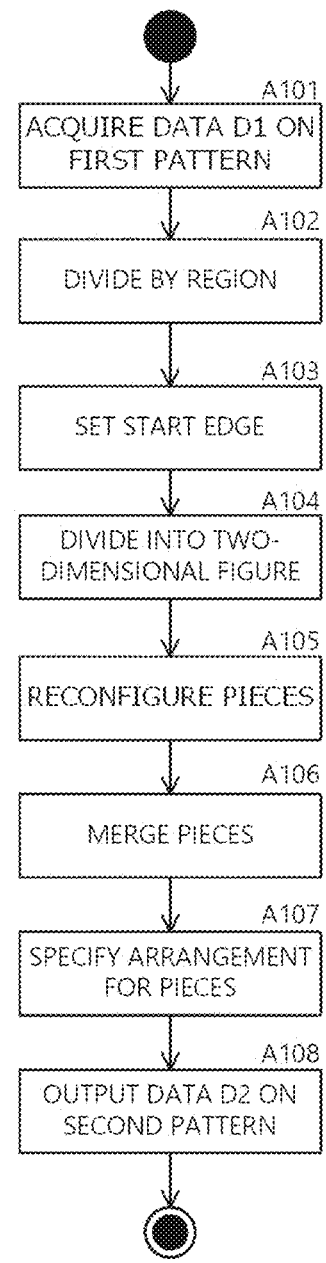
FIG. 3 is an activity diagram illustrating an example of information processing by the information processing apparatus 1.

Section 3 describes an information processing method executed by the above-described information processing apparatus 1 along an activity diagram, with reference to conceptual diagrams. FIG. 3 is an activity diagram illustrating an example of information processing by the information processing apparatus 1.

First, the user inputs data D1 on a first pattern, which is a three-dimensional model M of garment to be produced, into the information processing apparatus 1 via the input unit 15. The acquisition unit 131 acquires the data D1 on the first pattern. (Activity A101)

The process in Activity A101 allows the user to upload any existing pattern data. As a result, the information processing apparatus 1 can execute optimization processing for a design and specifications specified by the user.

Figure 4:
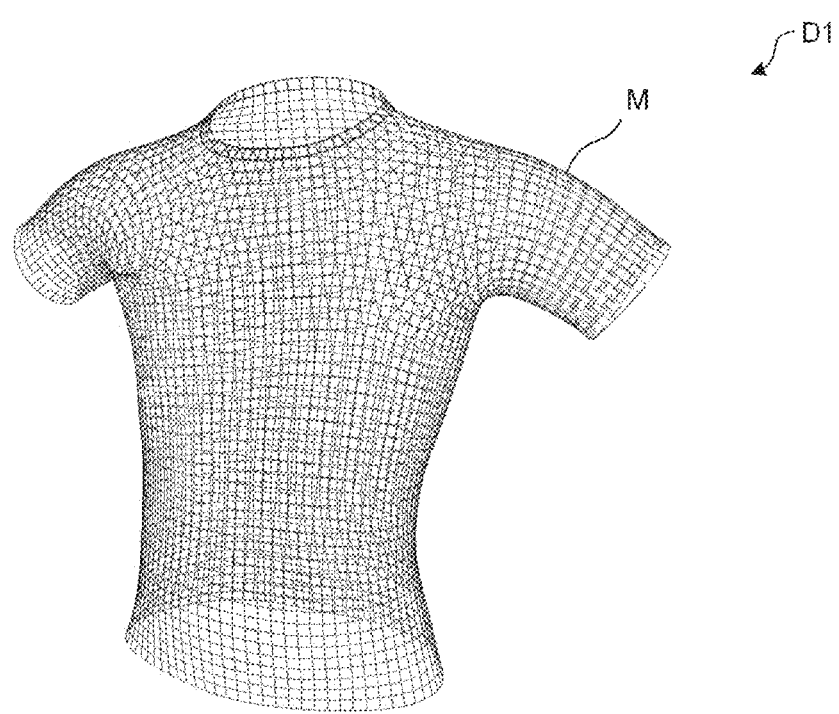
FIG. 4 illustrates an example of a model M.

Next, the output unit 136 displays the model M of the read data D1 on the first pattern. FIG. 4 illustrates an example of model M. As illustrated in FIG. 4, the data D1 on the first pattern relates to a shape of specific garment. Hereinafter, a description will be given of an example where the model M is a T-shirt. The model M may be associated with a type of garment.

Figure 5:
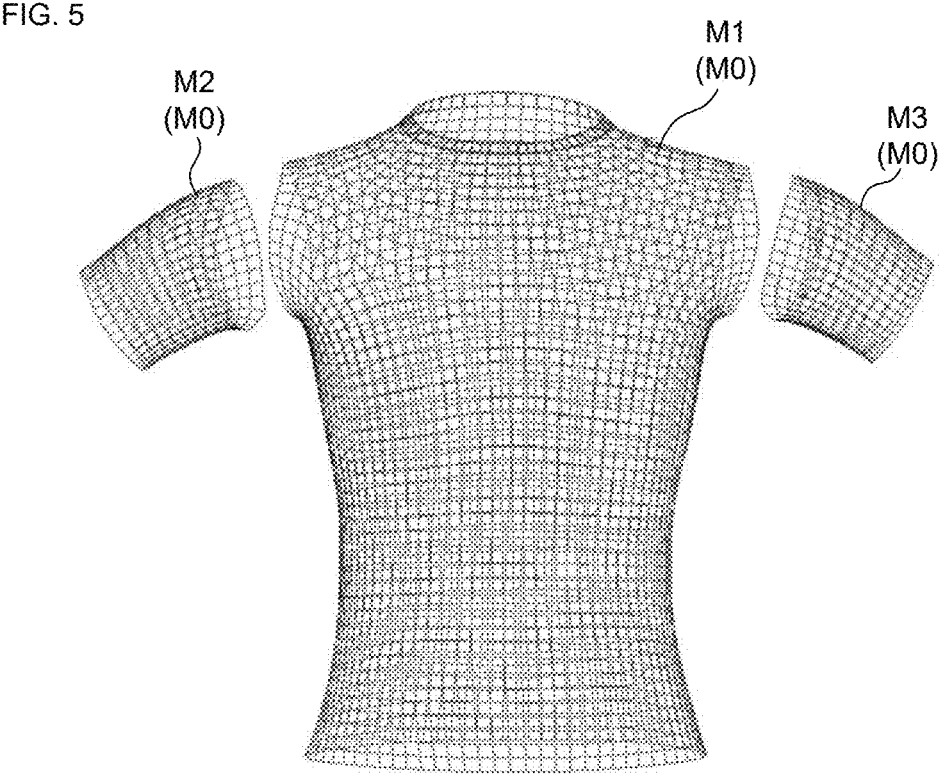
FIG. 5 illustrates an example of a model M divided into regions M0.

Next, the user selects an edge (start edge ME1 in FIG. 6) or a mesh ME (in FIG. 7) of the model M and specifies a division point for dividing the model M into regions M0. The acquisition unit 131 acquires information pertaining to the division point, and the division unit 134 divides the model M into regions M0 based on the acquired information (Activity A102). FIG. 5 illustrates an example of a model M divided into the regions M0. As illustrated in FIG. 5, the model M is divided into a region M1 (M0), which is a body, and a region M2 (M0) and a region M3 (M0), which are sleeves. Here, the division unit 134 may divide the model M into regions of less than or equal to a threshold. Here, the threshold may depend on material applicable to the first pattern, on the size of the garment, or the like. Such a configuration can prevent division into too many regions. For example, the threshold depending on material appliable to the first pattern, on the size of the garment, or the like may be stored in the storage unit 12 in advance, or may be set or changed by user's operation via the screen.

The division in Activity A102 may be executed by a separate information processing apparatus configured to communicate with the information processing apparatus 1. For example, the acquisition unit 131 may acquire the model M divided into the regions M0 from the separate information processing apparatus. In other words, the model M may be a region M0 of specific garment. In this case, the acquisition unit 131 acquires two or more models M, and the models M are associated with the type of the regions M0.

Figure 6:
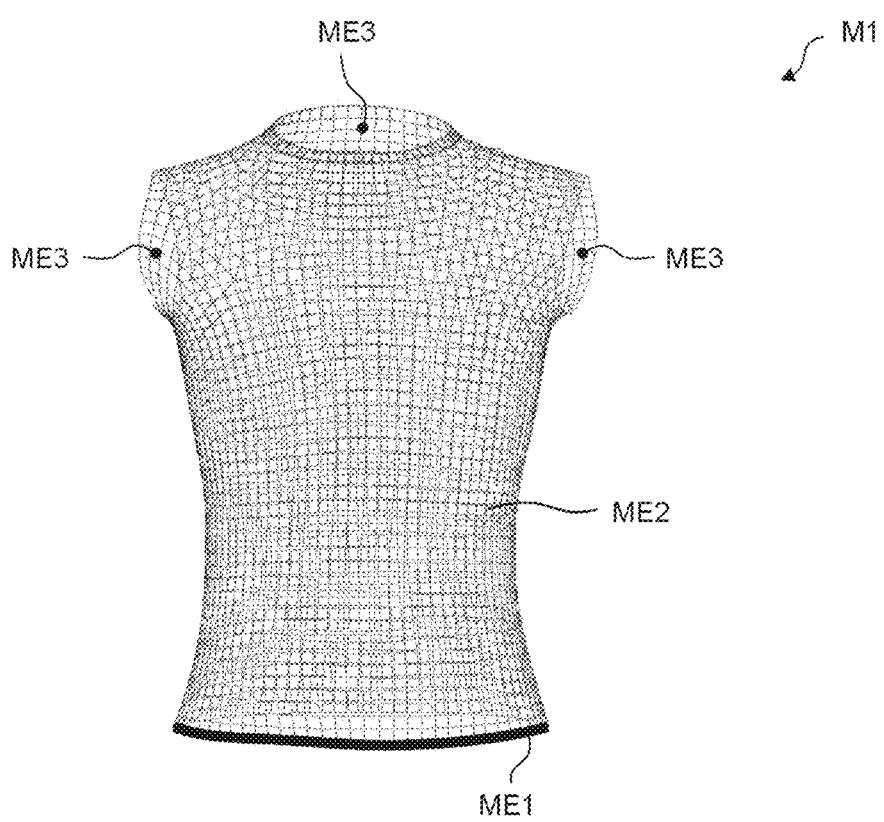
FIG. 6 illustrates an example of a region M1 where a start edge ME1, a target surface ME2, and a clip surface ME3 are set.

Here, the user sets the start edge ME1 as an edge for starting division into meshes ME. In other words, the acquisition unit 131 receives a setting operation via a screen or the like (Activity A103). In addition, a target surface ME2, which is a two-dimensional surface to be divided, is set. Moreover, a clip surface ME3 or the like, which is a two-dimensional surface not subject to the division, is set. FIG. 6 illustrates an example of a region M1 with a start edge ME1, a target surface ME2 and a clip surface ME3 set. As illustrated in FIG. 6, the user selects points of the region M1 to be designated as the start edge ME1, the target surface ME2, and the clip surface ME3. The acquisition unit 131 acquires information thereof. The acquisition unit 131 may store the acquired information in the storage unit 12 as the reference information IF1. FIG. 6 illustrates an example when the hem of the T-shirt is set as the start edge ME1. The start edge ME1, the target surface ME2, the clip surface ME3, etc. is set to prevent the division from reaching deadlock.

The specification unit 133 may specify the start edge ME1, the target surface ME2, or the clip surface ME3 on the basis of the shape of the model M and of the reference information IF1. For example, the specification unit 133 may specify, based on the model M and a trained model, an edge of a large opening such as the hem of a skirt as the start edge ME1. The specification unit 133 may specify an opening for passing a neck, arm, leg, etc. through the garment as the clip surface ME3. In FIG. 6, an example is given of a case where openings for the neck and arms are set as clip surfaces (ME3).

Figure 7:
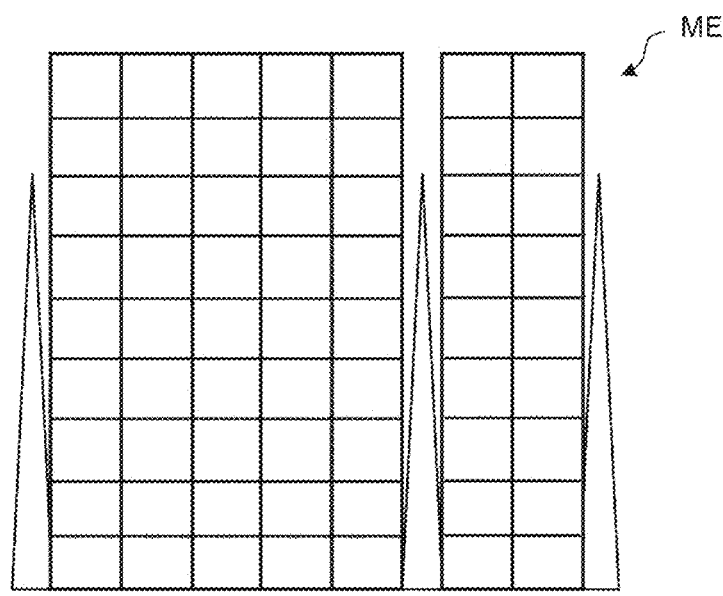
FIG. 7 illustrates part of the model M transformed into two or more two-dimensional figures.

Next, the division unit 134 divides at least part of the model M into two or more meshes ME, the model M representing the shape of the specific garment and having been created based on the data D1 on the first pattern (Activity A104). Specifically, the division unit 134 determines, based on the model M and the reference information IF1, the shapes of the meshes ME to be two-dimensional figures, and executes division into pieces P constituting the region M0 of the garment. FIG. 7 illustrates part of the model M transformed into two or more two-dimensional figures. As illustrated in FIG. 7, a mesh ME includes at least one of triangle and quadrilateral. The triangle may be isosceles triangle. The quadrilateral may be square. The processing in Activity A104 allows the patterned shape to be divided into such shapes that a waste amount is reduced when the meshes are arranged on a fabric cloth generally produced in quadrilateral shape.

Here, the reference information IF1 includes information specifying a length of at least one side of the at least one of triangle and quadrilateral (hereinafter referred to as a pitch number). FIG. 7 illustrates an example of a case where 5 cm is specified as the pitch number.

The reference information IF1 further includes an environmental index in the production of the garment. Specifically, for example, the reference information IF1 includes an index relating to sewing of the garment. The index relating to sewing of garment is, for example, a diffusion value, an approximate value, a moderator for Z value, or the like.

The reference information IF1 includes a first variable associated with a region of the regions M0 and a second variable associated with a type of garment. The division unit 134 may determine the shape of the mesh ME based on the first variable or the second variable. Such an aspect allows conversion into plane figures to be executed with a variable optimum for the region M0 and for the type of garment. The reference information IF1 may include an index relating to the strength of the garment.

Figure 8:
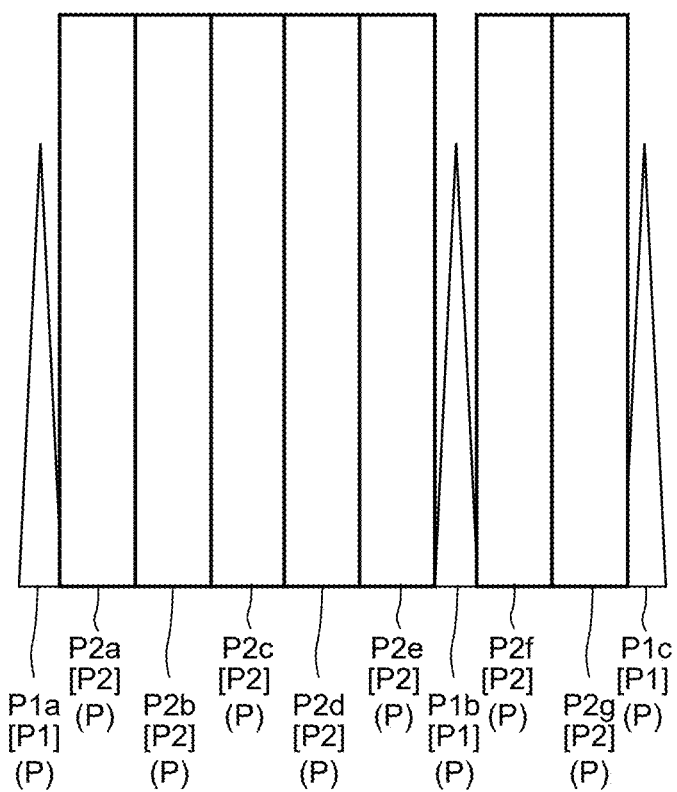
FIG. 8 illustrates an example of reconfigured pieces P.

Next, the reconfiguration unit 135 reconfigures the pieces P based on the mesh ME and on the reference information IF1 (Activity A105). Then, the output unit 136 outputs the reconfigured pieces P. FIG. 8 illustrates an example of reconfigured pieces P. As illustrated in FIG. 8, pieces P1 are pieces P of isosceles triangle. Pieces P2 are pieces P of rectangular. By converting complicatedly divided shapes into a two-dimensional pattern shape that can be practically used, the processing in Activity A105 can execute conversion into pattern data usable in manufacturing. In addition, the reconfiguration unit 135 represents the correspondence between the three-dimensional shape to be realized and the two-dimensional shape required as a plan, making it easier for the user to understand it.

Next, the user provides an input operation to select pieces P to be merged. Then, the merging unit 137 merges the pieces P based on the selection operation by the user (Activity A106). The process in Activity A106 allows the number of pieces to be adjusted, i.e., increased or decreased, based on the convenience of production including cutting, sewing, etc. More specifically, pieces can be reduced by being merged so that the sewing amount does not become too much.

Figure 9:
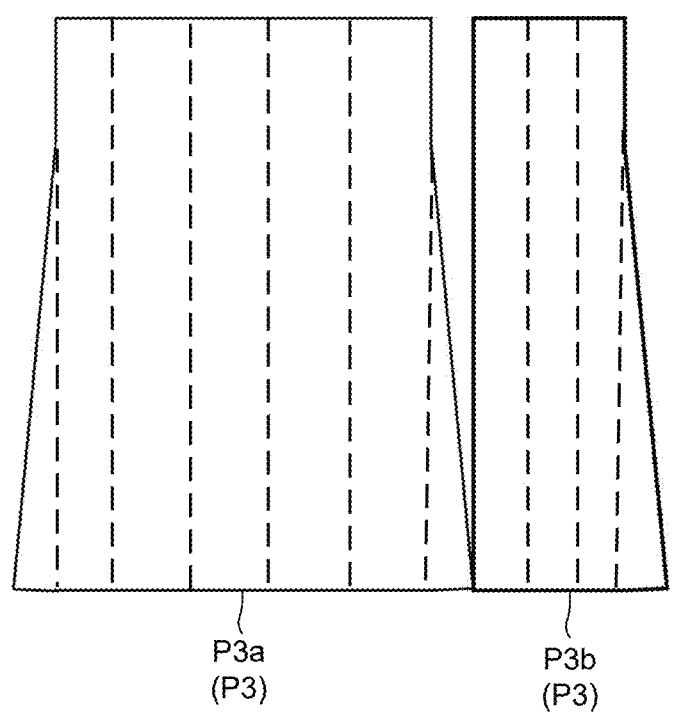
FIG. 9 is a conceptual diagram illustrating shapes of pieces P3 acquired by merging two or more pieces P.

FIG. 9 is a conceptual diagram illustrating shapes of pieces P3 acquired by merging by two or more pieces P. As illustrated in FIG. 9, adjacent pieces P are merged with each other. A piece P3a illustrated in FIG. 9 is a piece P acquired by merging a piece P1a, a piece P1b, a piece P2a, a piece P2b, a piece P2c, a piece P2, and a piece P2e (see FIG. 8). A piece P3b is a piece P acquired by merging a piece P2f, a piece P2g, and a piece P1c.

Next, the specification unit 133 calculates two or more of arrangements differing from each other in positions where the pieces P are arranged. Thereafter, the specification unit 133 specifies such an area that meets a predetermined condition from the arrangements, and specifies two or more arrangements (Activity A107). Thereafter, the determination unit 138 determines, based on a genetic algorithm, an arrangement from among the two or more arrangements. The process in Activity A107 can automatically specify an arrangement with the least waste amount.

Then, the output unit 136 outputs data D2 on a second pattern including the specified arrangement (Activity A108).

Figure 10:
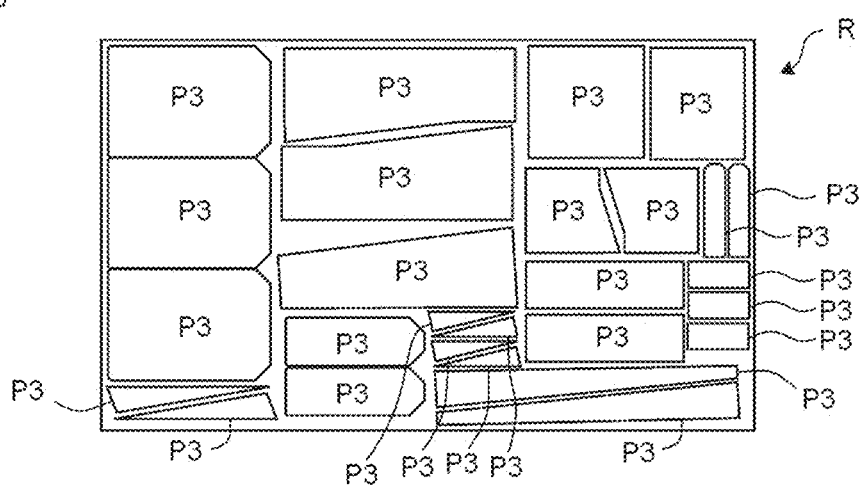
FIG. 10 is a conceptual diagram illustrating an example of an arrangement.

Here, the data D2 on the second pattern includes a shape of the two or more two-dimensional pieces P3 of the specific garment and an area R where the pieces P3 are arranged in such a manner that they do not overlap each other. FIG. 10 is a conceptual diagram illustrating an example of an arrangement. As illustrated in FIG. 10, the area R is a single area R, which contains all or part of the pieces P3 inside it. The process in Activity A108 allows outputting line data that can be applied to apparel CAD or cutting equipment, i.e., outputting information that can practically be implemented.

Each of the pieces P3 is disposed in the area R in such a manner that a value of (a total area size S2 of the pieces P3/an area size S1 of the area R) is equal to or more than a predetermined threshold. Specifically, the value of (the total area size S2 of the pieces P3/the area size S1 of the area R) is, for example, 30, 35, 40, 45, 50, 55, 60, 65, 70, 75, 80, 85, 90, 95, or 99%, or may be in the range between any two of the values given as examples here.

In addition, each of the pieces P3 is disposed in the area R in such a manner that the total number of the pieces P3 in the area R is less than or equal to a predetermined threshold. Specifically, the total number of pieces P3 in the area R is, for example, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200, or may be in the range between any two of the values given as examples here. Setting the total number of pieces in the area to be less than or equal to the threshold can prevent the arrangement or the number of pieces from varying when the size of the material or of garment differ. The threshold may depend on the size of the material or of the garment. For example, the thresholds depending on the size of the material or of the garment may be stored in the storage unit 12 in advance, or may be set or changed based on to the operation by the user via the screen.

Thus, the output unit 136 outputs, based on the data D1 on the first pattern and the reference information IF1 on the production of the garment, the data D2 on the second pattern relating to the shape of specific garment. Such above-described information processing can provide a second pattern superior to the first pattern. More specifically, it is possible to provide a second pattern with less material waste than the first pattern. As a result, the waste rate of the material can be reduced.

4. Others (Variations)

The following may be adopted to the information processing system of the above-described embodiments.

The acquisition unit 131 may acquire, by physical calculation, a simulation result relating to a stretch or shrink amount of the garment produced with the data D2 on the second pattern used. Furthermore, the specification unit 133 may specify, based on the simulation result, a point where the stretch or shrink amount meets a predetermined condition in the garment. In addition, the output unit 136 may display the specified point.

In Activity A106, the merging unit 137 may merge adjacent meshes ME when the length between the boundary of the divided meshes ME meets a predetermined condition. Such an aspect allows the data D2 on the second pattern to be output with less effort on operation input by the user.

An information processing method may be provided that includes each step in the information processing apparatus 1. Furthermore, the present embodiment may be implemented as a distributable program. This program causes a computer to execute each step in the information processing apparatus 1.

The information processing system may include components besides the information processing apparatus 1. For example, the information processing system may be implemented that includes the information processing apparatus 1, an unillustrated input apparatus, and an unillustrated display apparatus. Connection methods thereof are not particularly limited, and services to be provided via Internet may be provided.

In the above embodiment, the reference information IF1 is described to be a trained model, but the reference information IF1 may be a mathematical model or the like that mathematically relates two or more pieces of information of a look-up table, a database, etc.

In the processing illustrated in FIG. 3, the information processing apparatus 1 may omit the process in Activity A102 and Activity A103 when executing the processing. In other words, an operation such as clicking on the three-dimensional model inputted via the screen, etc. may trigger that the information processing apparatus 1 divides the entire garment represented as the three-dimensional model into two-dimensional figures at once. Such a process enables entire optimization on the entire shape of the garment at once, without dividing it into regions (e.g., into sleeves and body piece). In addition, the entire shape of the garment can be wholly optimized at once without setting the start edge.

The present disclosure may be provided in the following aspects.

CLAIMS (1) An information processing system comprising: a controller configured to execute each of the following steps of: an acquisition step of acquiring data on a first pattern relating to a shape of a specific garment; and an output step of outputting, based on the data on the first pattern and reference information on production of the garment, data on a second pattern relating to the shape of the specific garment, the data on the second pattern including: shapes of two or more two-dimensional pieces of the specific garment; and an area where the pieces are disposed in such a manner that they do not overlap each other and that a total number of the pieces in the area is less than or equal to a predetermined threshold.

(2) The information processing system according to (1), wherein the reference information includes an environmental index of the production of the garment.

Such an aspect allows the data on the second pattern to be created with the environment considered.

(3) The information processing system according to (1), wherein the reference information includes an index relating to sewing of the garment.

Such an aspect can realize environmentally friendly and easy-to-sew garment.

(4) The information processing system according to (1), wherein the area is a single area and contains all or part of the pieces inside the area.

Such an aspect allows the garment to be produced from a single material, thereby reducing the environmental load.

(5) The information processing system according to (1), wherein each of the pieces is disposed in the area in such a manner that: the total number of the pieces in the area is less than or equal to a predetermined threshold, and a value of (a total area size S2 of the pieces/an area size S1 of the area) is more than or equal to a predetermined threshold.

Such an aspect can reduce the waste amount discharged in the production of the garment, further reducing the environmental load.

Such an aspect can reduce efforts required in producing the garment, further reducing the environmental load.

(6) The information processing system according to (1), wherein the steps further include a specification step of specifying such an area that meets a condition from two or more arrangements, which differ from each other in positions where the pieces are disposed, and specifying two or more arrangements, and the output step outputs data on a second pattern including the specified arrangements.

(7) The information processing system according to (6), wherein the steps further include a determination step of determining, based on a genetic algorithm, one arrangement from among the two or more arrangements.

(8) The information processing system according to (1), wherein the steps further include a division step of dividing, into two or more meshes, at least part of a model representing the shape of the specific garment, the model being created based on the data on the first pattern, and the pieces are reconfigured based on the two or more divided meshes and on the reference information.

Such an aspect allows a single system to automatically divide a necessary model into meshes for creating the data on the second pattern, thereby providing an excellent user experience.

Such an aspect enables optimization of the piece shapes by suitably combining meshes, further reducing the environmental load.

(9) The information processing system according to (8), wherein a shape of each of the two or more meshes is a two-dimensional figure.

Such an aspect can reduce a load on a computer caused by calculations.

(10) The information processing system according to (8), wherein the division step determines, based on the model and the reference information, the shape of each of the two or more meshes.

Such an aspect can optimize the mesh shapes.

(11) The information processing system according to (10), wherein the meshes include at least one of triangle and quadrilateral, and the reference information includes information specifying a length of at least one side of the at least one of triangle and quadrilateral.

(12) The information processing system according to (10), wherein the model is associated with two or more regions or with a type of garment, the reference information includes a first variable associated with a region of the regions, or a second variable associated with the type of garment, the division step determines shapes of the meshes based on the first variable or the second variable.

(13) The information processing system according to (1), wherein the acquisition step acquires, by physical calculation, a simulation result relating to a stretch or shrink amount of a garment produced by using the data on the second pattern, and the steps further include: a specification step of specifying, based on the simulation result, a point where the stretch or shrink amount of the garment meets a predetermined condition; and an output step of displaying the specified point.

(14) The information processing system according to (8), wherein the steps further include a merging step of merging adjacent meshes when a length of a boundary between the divided meshes meets a predefined condition, and the pieces are generated by merging the meshes.

(15) The information processing system according to (8), wherein the division step divides at least part of the model into less than or equal to a threshold, the model representing the shape of the specific garment and being created based on the data on the first pattern.

(16) An information processing method comprising each step in the information processing system according to any one of claims 1 to 15.

Such an aspect can provide a second pattern superior to the first pattern.

(17) A program configured to allow a computer to execute each step in the information processing system according to any one of the claims 1 to 15.

Such an aspect can provide a second pattern superior to the first pattern. Of course, the present disclosure is not limited to these Finally, various embodiments of the present disclosure have been described, but these are presented as examples and are not intended to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the invention described in claims and the equivalent scope thereof.

The invention claimed is:

1. An information processing system comprising:
   a controller including a processor configured to execute each of the following steps of:
   an acquisition step of acquiring data on a first pattern relating to a shape of a garment;
   a division step of dividing, into a plurality of meshes, at least part of a model representing the shape of the garment, the model being created based on the data on the first pattern, a plurality of two-dimensional pieces of the garment being reconfigured based on the plurality of meshes and reference information on production of the garment;
   a merging step of merging adjacent two meshes of the plurality of meshes when a length of a boundary between the adjacent two meshes satisfies a predefined condition, the plurality of two-dimensional pieces being generated by merging the adjacent two meshes; and
   an output step of outputting, based on the data on the first pattern and the reference information, data on a second pattern relating to the shape of the garment, the data on the second pattern including:
     shapes of the plurality of two-dimensional pieces; and
     an area where the plurality of two-dimensional pieces are disposed in such a manner that they do not overlap each other and that a total number of the plurality of two-dimensional pieces in the area is less than or equal to a first predetermined threshold.

2. The information processing system according to claim 1, wherein
   the reference information includes an environmental index of the production of the garment.

3. The information processing system according to claim 1, wherein
   the reference information includes an index relating to sewing of the garment.

4. The information processing system according to claim 1,
wherein the area is a single area and contains all or part of the plurality of two-dimensional pieces inside the single area.

5. The information processing system according to claim 1, wherein
each of the plurality of two-dimensional pieces is disposed in the area in such a manner that:
the total number of the plurality of two-dimensional pieces in the area is less than or equal to the first predetermined threshold, and
a value of S2/S1 is more than or equal to a second predetermined threshold, the S1 is an area size of the area, and the S2 is a total area size of the plurality of two-dimensional pieces.

6. The information processing system according to claim 1, wherein
the steps further include:
a specification step of specifying such a specified area that meets a condition from a plurality of arrangements, which differ from each other in positions where the plurality of two-dimensional pieces are disposed, and specifying one arrangement of the plurality of arrangements having the specified area; and
the output step outputs the data on the second pattern including the specified one arrangement.

7. The information processing system according to claim 6, wherein the steps further include
a determination step of determining, based on a genetic algorithm, the specified one arrangement from the plurality of arrangements.

8. The information processing system according to claim 1, wherein
a shape of each of the plurality of meshes is a two-dimensional figure.

9. The information processing system according to claim 1, wherein
the division step determines, based on the model and the reference information, the shape of each of the plurality of meshes.

10. The information processing system according to claim 9, wherein
the plurality of meshes include at least one of triangle and quadrilateral, and
the reference information includes information specifying a length of at least one side of the at least one of triangle and quadrilateral.

11. The information processing system according to claim 9, wherein
the model is associated with a plurality of regions or a type of the garment,
the reference information includes:
a first variable associated with a first region of the plurality of regions; or
a second variable associated with the type of the garment, and
the division step determines shapes of the plurality of meshes based on the first variable or the second variable.

12. The information processing system according to claim 1, wherein
the acquisition step acquires, by calculation, a simulation result relating to a stretch or shrink amount of the garment produced by using the data on the second pattern, and
the steps further include:
a specification step of specifying, based on the simulation result, a point where the stretch or shrink amount of the garment meets a predetermined condition; and
the output step of displaying the specified point.

13. The information processing system according to claim 1, wherein
the division step divides at least part of the model into less than or equal to a threshold number.

14. An information processing method comprising each step in the information processing system according to claim 1.

15. A non-transitory computer-readable memory medium storing a program configured to allow a computer to execute each step in the information processing system according to claim 1.

* * * * *